United States Patent Office 3,255,489
Patented June 14, 1966

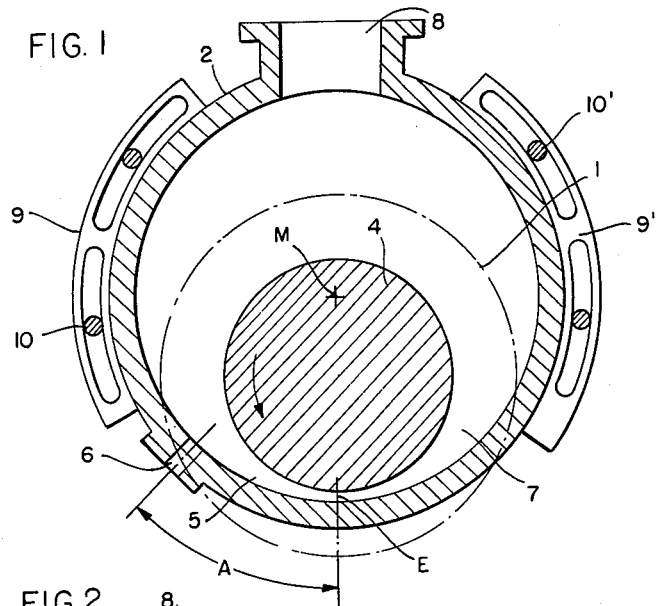
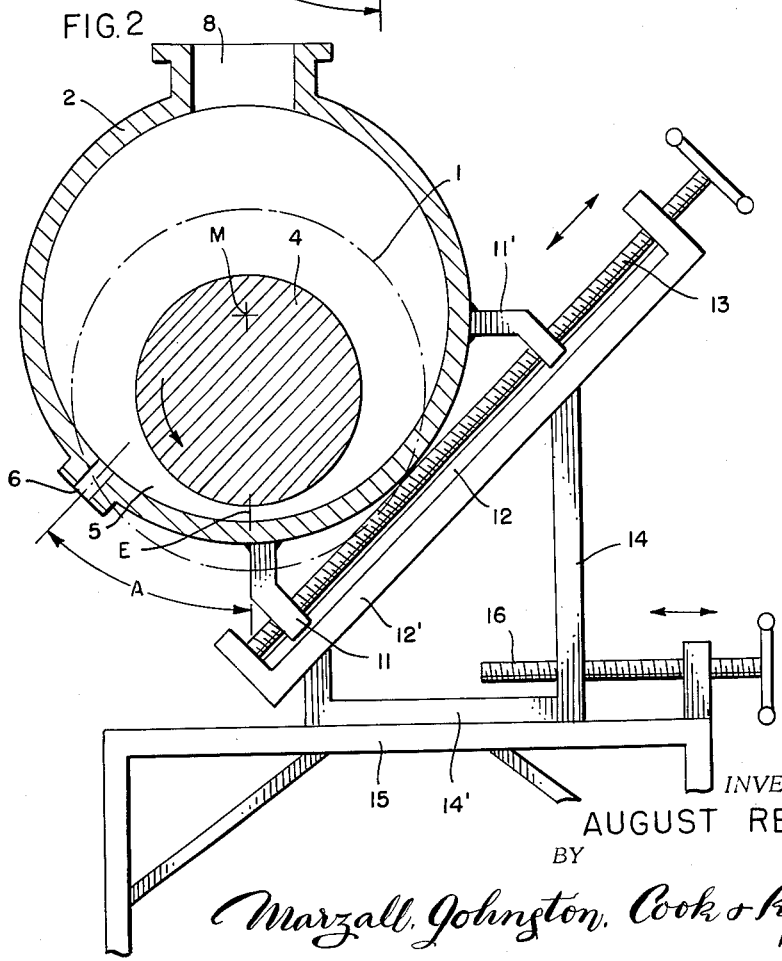

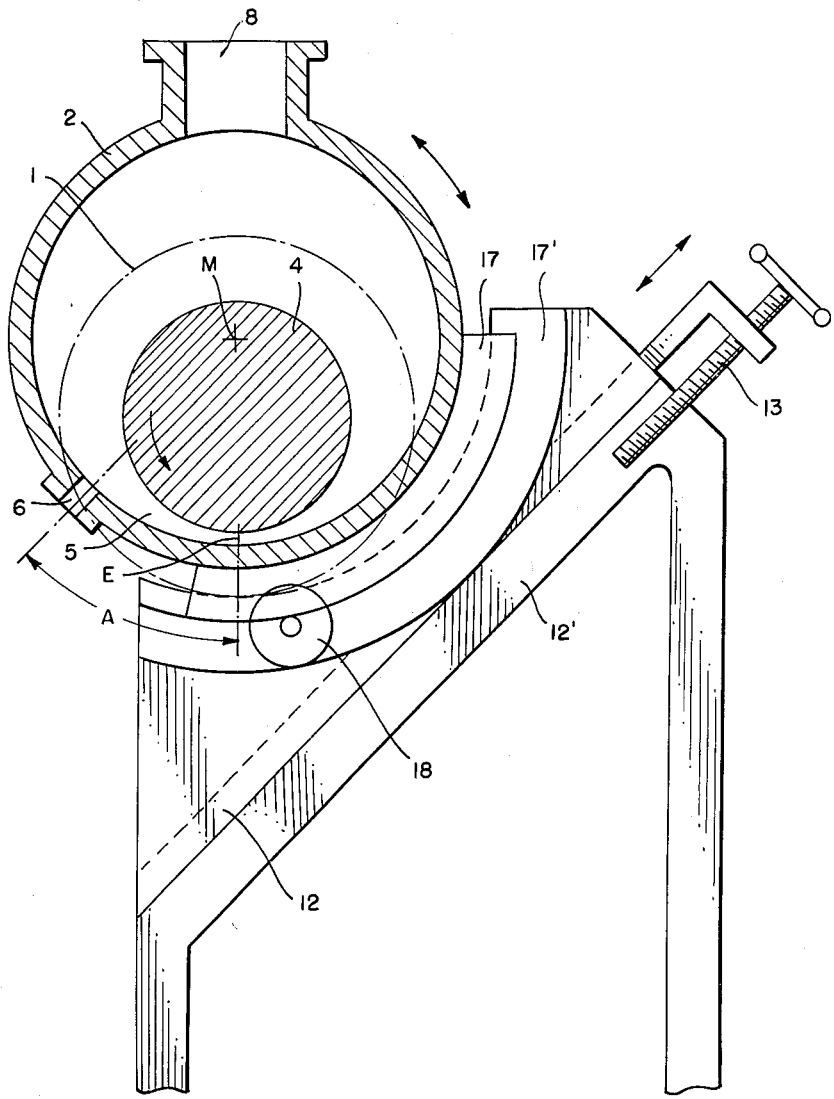

3,255,489
APPARATUS FOR PROCESSING THERMOPLASTICS IN SCREW EXTRUDERS HAVING PULSATING DISCHARGE
August Rettig, Ludwigshafen (Rhine), Germany, assignor to Badische Anilin- & Soda-Fabrik Aktiengesellschaft, Ludwigshafen (Rhine), Germany
Filed Nov. 20, 1964, Ser. No. 412,733
Claims priority, application Germany, Nov. 27, 1963, B 74,423
7 Claims. (Cl. 18—12)

This invention relates generally to mixing and kneading machines which are characterized by irregularly or periodically pulsating discharge of plastic material. It relates particularly to screw extruders and similar apparatus, e.g., ko-kneaders, for an improved and milder treatment of plastics with or without additives.

U.S. Patent No. 3,047,907 describes an apparatus for processing thermoplastics in screw extruders and ko-kneaders and for the uniform discharge of the plasticized plastics from such machines, the said apparatus comprising a chamber provided at the outlet end of the injection cylinder of the screw extruder or ko-kneader, the wall of the said chamber being provided with a discharge nozzle, a journal projecting into the said chamber, the said journal being coaxially secured to the screw shaft or to the kneader shaft reciprocating in an axial direction. The pulsating discharge of the material from the said machines is equalized by the special design of the said chamber, in which the journal coupled with the screw or kneader shaft rotates. The internal diameter of the chamber forming the working space of the journal and whose wall is provided with the discharge nozzle is larger than the internal diameter of the injection cylinder, and the chamber is connected eccentrically to the injection cylinder. As a result of the eccentricity of the chamber there is formed a constriction between the journal and the chamber wall, which constriction is located, with respect to the direction of rotation and conveyance of the journal, immediately behind the discharge nozzle in the region of the wedge-shaped intake zone of the journal. Corresponding to the increased pressure which builds up in the wedge shaped intake zone and causes the uniform and positive discharge of the material through the discharge nozzle, a pressureless zone is set up on the other side of the constriction. This pressureless zone and the opening provided in the chamber wall within this zone favor the removal of the last of the volatile constituents of the material treated in the screw extruder or ko-kneader.

I have now found that the action of a discharge apparatus of the said type can be further improved by making the position of the discharge nozzle adjustable with respect to the constriction formed between the extension of the shaft and the chamber at the end of the feed zone and/or making the gap width of the constriction variable.

The mixing and kneading action produced in the zone in front of the constriction, which is attributable to shear stresses present at this point, and also the devolatilization efficiency of the discharge means behind the constriction may be adapted to a great extent to different operating conditions and to different qualities and viscosities of the material to be treated by varying the distance between the constriction and the discharge nozzle on the one hand and/or at the same time, or independently thereof, the width of the gap of the constriction.

Three embodiments of improved discharge means are shown diagrammatically in section elevation in the accompanying drawings and will now be described:

FIGURE 1 shows a chamber 2 connected eccentrically to an injection cylinder 1 of smaller diameter lying behind the chamber and indicated by a dash-dot-dash line. A journal 4 rigidly secured to the screw or kneader shaft in the cylinder 1 and projecting into the chamber 2 forms with the wall of the chamber 2 a constriction E. The discharge orifice 6 is located in the region of the intake zone 5. In order that the distance A between the constriction E and the discharge orifice 6 (measured for example by circular measure) and also the distance between the degassing opening 8 and the constriction E may be varied, the chamber housing is provided with slotted supports 9 and 9'. These supports are provided with arcuate slots for the reception of guide rods 10 and 10' so that the chamber 2 may be rotated about a mid-point M, sliding on the rods 10 and 10'. Locking means (not shown) are provided to hold the chamber in the desired position; they may be any conventional type of locking means. For a constant gap width in the constriction E, a given angular velocity of the rotating journal 4 and a given viscosity of the material introduced into the chamber 2, the build-up of material in the intake zone 5 has a definite volumetric extent. By varying the distance A, the discharge orifice may be moved farther into or out from the shear field of the intake zone with the said means. Similarly the pressure in front of the discharge orifice 6 may be adapted to a certain extent to the prevailing method of operation by varying the distance A.

Another embodiment is illustrated in FIGURE 2 in which a variation of the distance A between the constriction E and the discharge orifice 6 of the chamber is combined with a simultaneous variation in the gap width of the constriction E. The chamber housing is rigidly connected via supports 11 and 11' with a slide 12 which slides without play in a guide 12'. The chamber 2 is moved by means of a threaded spindle 13. The inclined guide member 12' is in turn mounted on a frame 14 whose lower horizontal base is slidably carried on a horizontal table 15. Movement of the guide member 12' in a horizontal direction is effected by means of a threaded spindle 16.

FIGURE 3 illustrates a further embodiment of the invention in which the distance A of the discharge orifice 6 from the constriction E and the width of the constriction E may be adjusted independently of each other. In this case the chamber housing is mounted on arcuate guide slides 17 and 17', and the relative position of the arcuate member 17 with respect to the guide track 17' (by which the distance A can be varied) can be altered by means of a toothed wheel 18. The guide track 17' in its turn is mounted on an inclined slide 12 which can be moved up or down on its inclined surface by means of a threaded spindle 13 to vary the width of the constriction E.

I claim:
1. Apparatus for processing plastics in extruders having a pulsating discharge, comprising a chamber at the outlet end of the extruder cylinder, said chamber being eccentric to the cylinder and having an internal diameter larger than that of the cylinder, an extension of the screw of the extruder which projects freely into said eccentric chamber, and outlet nozzle from said chamber, the eccentricity of said chamber and the position of said outlet nozzle being such that a constriction between said extension and the chamber wall is formed immediately behind said outlet nozzle with respect to the direction of rotation of said extension, and means for varying the position of the outlet nozzle relatively to the constriction.

2. Apparatus for processing plastics in extruders having a pulsating discharge, a comprising chamber at the outlet end of the extruder cylinder, said chamber being eccentric to the cylinder and having an internal diameter larger than that of the cylinder, an extension of the screw of the extruder which projects freely into said eccentric chamber, an outlet nozzle from said chamber, the eccentricity of said chamber and the position of said outlet nozzle being such that a constriction between said extension and the chamber walls is formed immediately behind said outlet nozzle with respect to the direction of rotation of said extension, and means for varying the width of the gap in the constriction.

3. Apparatus for processing plastics in extruders having a pulsating discharge, comprising a chamber at the outlet end of the extruder cylinder, said chamber being eccentric to the cylinder and having an internal diameter larger than that of the cylinder, an extension of the screw of the extruder which projects freely into said eccentric chamber, an outlet nozzle from said chamber, the eccentricity of said chamber and the position of said outlet nozzle being such that a constriction between said extension and the chamber wall is formed immediately behind said outlet nozzle with respect to the direction of rotation of said extension, and means for varying simultaneously the position of the outlet nozzle relatively to the constriction and the width of the gaps in the constriction.

4. Apparatus as claimed in claim 1, comprising a mounting for said chamber which permits it to be rotated about its axis.

5. Apparatus as claimed in claim 2 comprising a slide rigidly connected with said chamber and capable of sliding in an inclined guide member, said inclined guide member being carried by a frame which is capable of horizontal movement.

6. Apparatus as claimed in claim 2 comprising an arcuate member carried by said chamber and capable of sliding within an arcuate guide track, said arcuate guide track being mounted on an inclined slide so as to be capable of movement up and down the inclined surface thereof.

7. Apparatus as claimed in claim 1, wherein the screw extruder is a ko-kneader.

References Cited by the Examiner

UNITED STATES PATENTS

| | | | |
|---|---|---|---|
| 410,822 | 9/1889 | Day | 18—12 |
| 1,980,898 | 11/1934 | Abernethy. | |
| 2,653,350 | 9/1953 | Piferoux | 18—12 |
| 2,845,656 | 8/1958 | Gabbrielli | 18—12 X |
| 3,047,907 | 8/1962 | Hanusch et al. | 18—2 X |
| 3,151,353 | 10/1964 | Rodenacker | 18—2 |

FOREIGN PATENTS 644,476    10/1962    Canada.

WILLIAM J. STEPHENSON, *Primary Examiner.*